United States Patent [19]

Laizans et al.

[11] 4,396,262
[45] Aug. 2, 1983

[54] HAND HELD TRANSPARENCY PROJECTOR WITH SIMPLE ADVANCE MECHANISM

[75] Inventors: Vitolds Laizans, Portland, Oreg.; John J. Richardson, Wayne, N.J.

[73] Assignee: View-Master International Group, Portland, Oreg.

[21] Appl. No.: 325,577

[22] Filed: Nov. 30, 1981

Related U.S. Application Data

[63] Continuation of Ser. No. 115,581, Jan. 25, 1980, abandoned.

[51] Int. Cl.³ .............................................. G03B 21/00
[52] U.S. Cl. ...................................... 353/43; 40/364; 40/95
[58] Field of Search .................. 353/43, DIG. 2, 109, 353/95, 96, 71, 74, 120, 122, 25, 26 R; 352/72, 78 R, 126, 121, 129, 137; 40/364, 366, 367

[56] References Cited

U.S. PATENT DOCUMENTS

| | | | |
|---|---|---|---|
| 1,814,588 | 7/1931 | De Vault . | |
| 2,100,008 | 11/1937 | Stephens | 353/43 |
| 2,146,237 | 2/1939 | Stephens | 353/43 |
| 2,583,510 | 1/1952 | Ingram | 353/43 |
| 2,764,058 | 9/1956 | Ellis | 353/43 |
| 3,218,745 | 11/1965 | Golden | 40/364 |
| 3,466,123 | 9/1969 | Skuja | 352/126 X |
| 3,801,199 | 4/1974 | Kaye | 353/120 X |
| 4,059,351 | 11/1977 | Wisotsky | 353/95 X |
| 4,185,899 | 1/1980 | Sherlock et al. | 353/71 X |

FOREIGN PATENT DOCUMENTS

| | | |
|---|---|---|
| 2415875 | 10/1974 | Fed. Rep. of Germany . |
| 1262048 | 2/1972 | United Kingdom . |
| 1325034 | 8/1973 | United Kingdom . |

*Primary Examiner*—Harry N. Haroian
*Attorney, Agent, or Firm*—Klarquist, Sparkman, Campbell, Leigh, Whinston & Dellett

[57] ABSTRACT

A hand-held transparency projector includes a housing having a recess formed in the housing for carrying a film cartridge, and a projection aperture in one end of the housing through which the images on the film in the cartridge may be projected. The housing carries a film-driving mechanism for advancing the film within the cartridge past the projection aperture when the cartridge is carried within the recess of the projector. The film-driving mechanism includes a claw mounted for slidable forward and return movements within the housing, the claw engaging perforations in the film at the end of the forward movement and advancing the film during the return movement in discrete steps of one frame.

7 Claims, 19 Drawing Figures

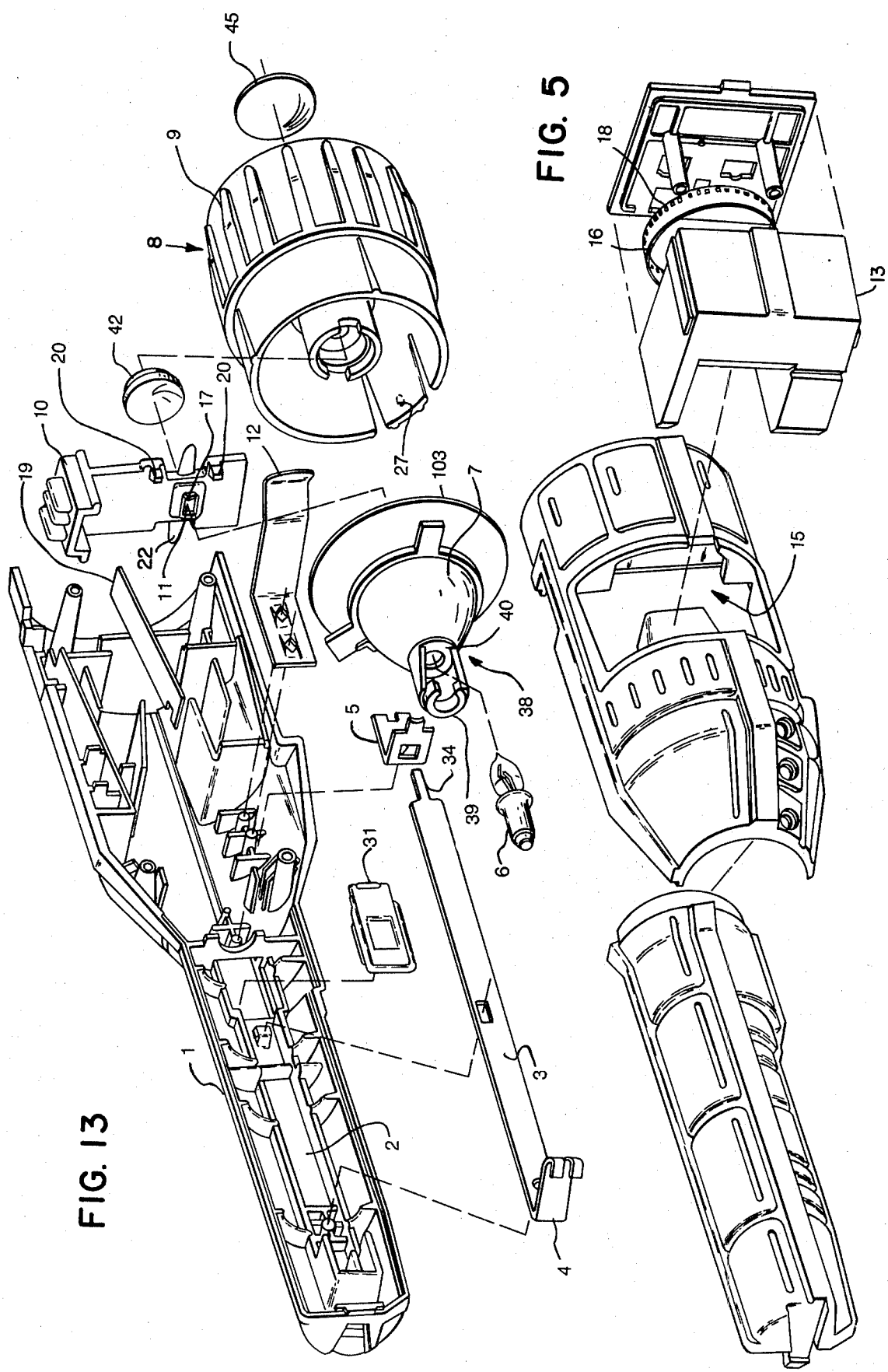

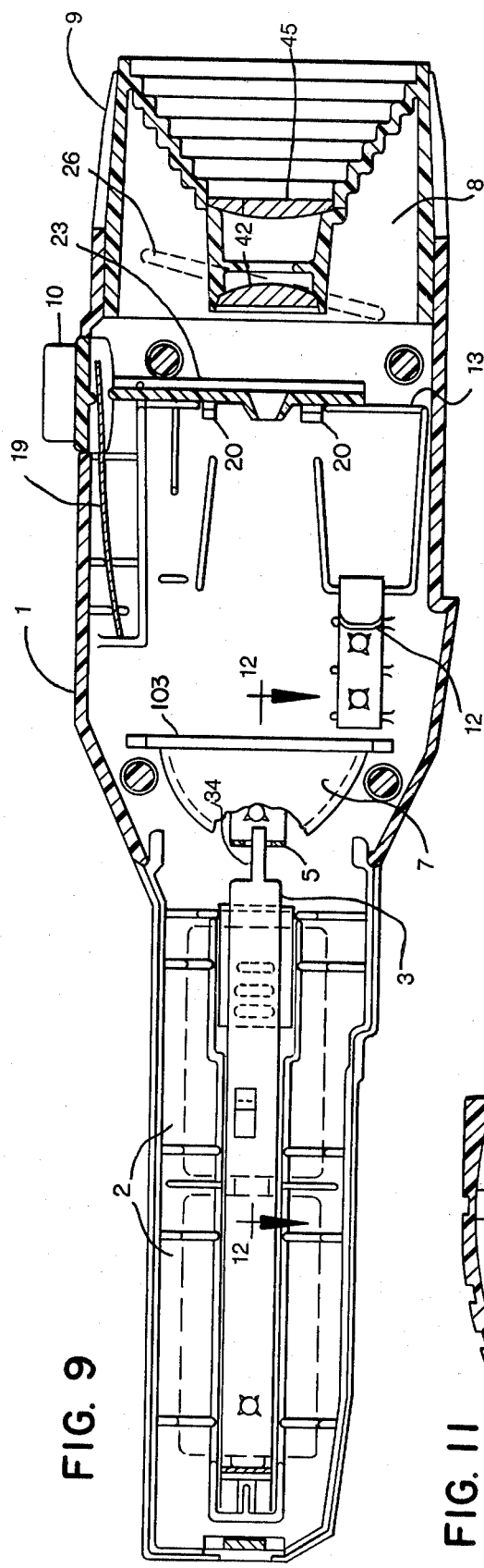
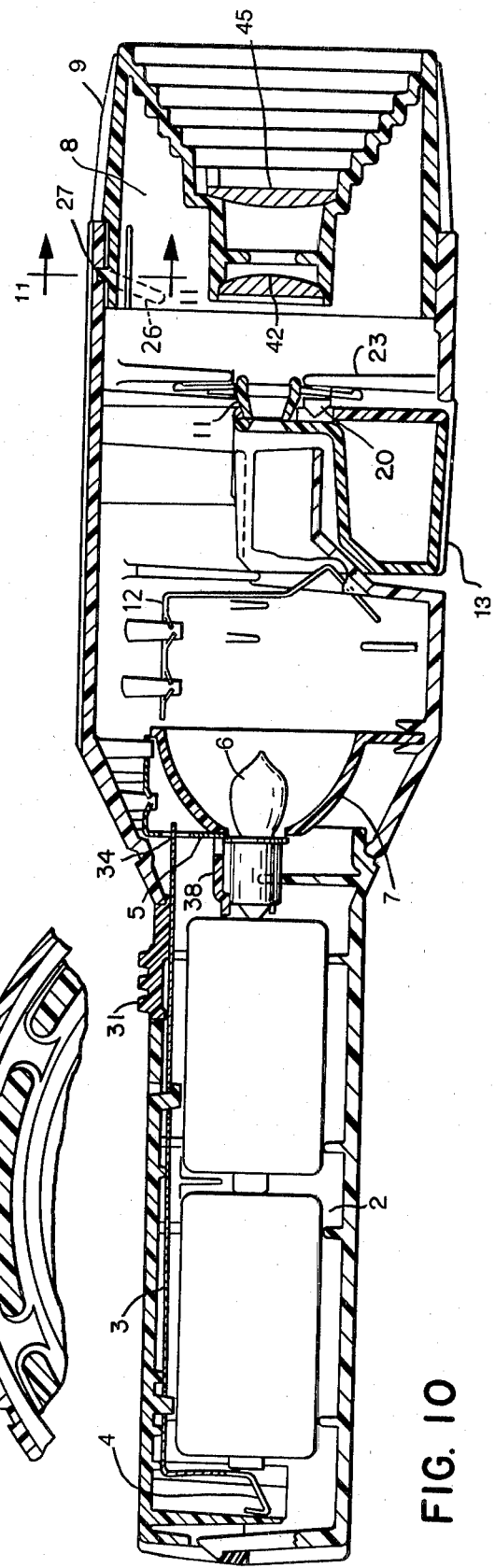
FIG. 9  FIG. 11  FIG. 10

FIG. 14
FIG. 18
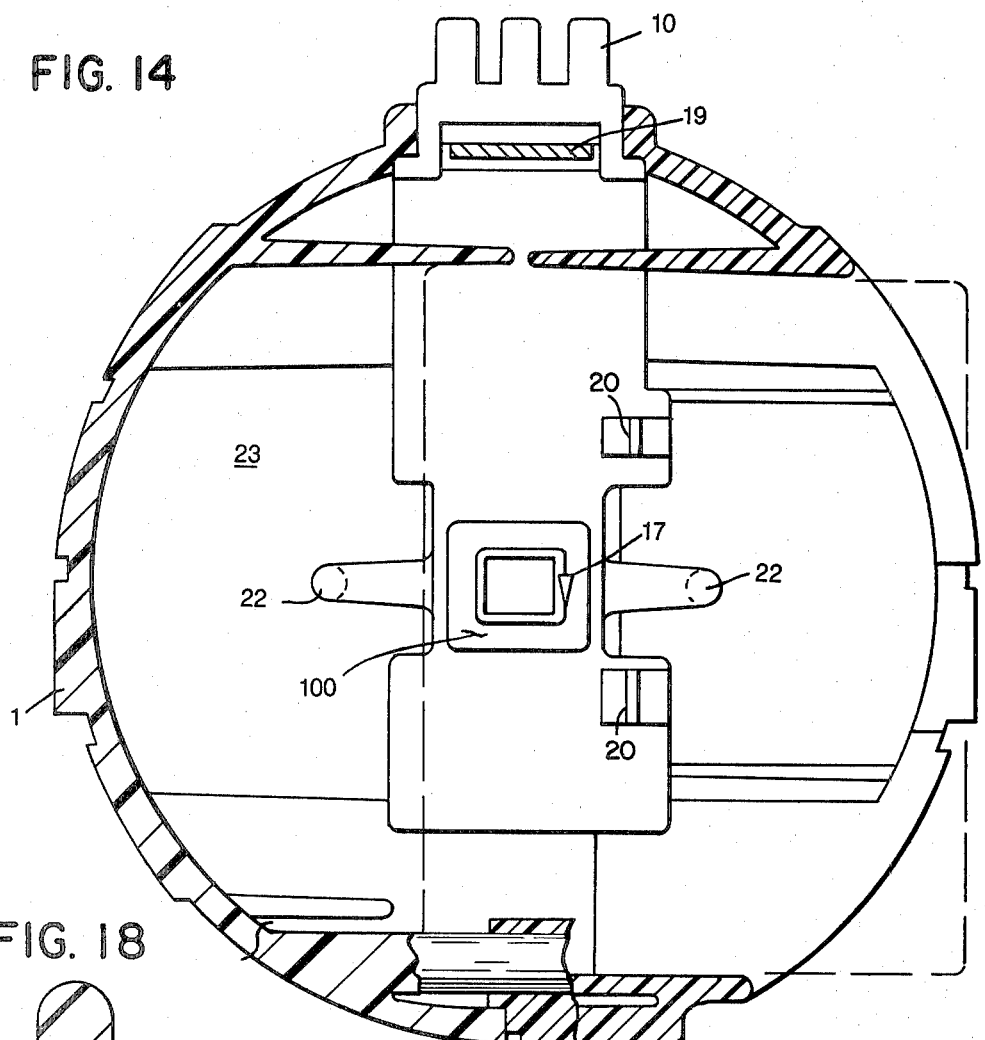
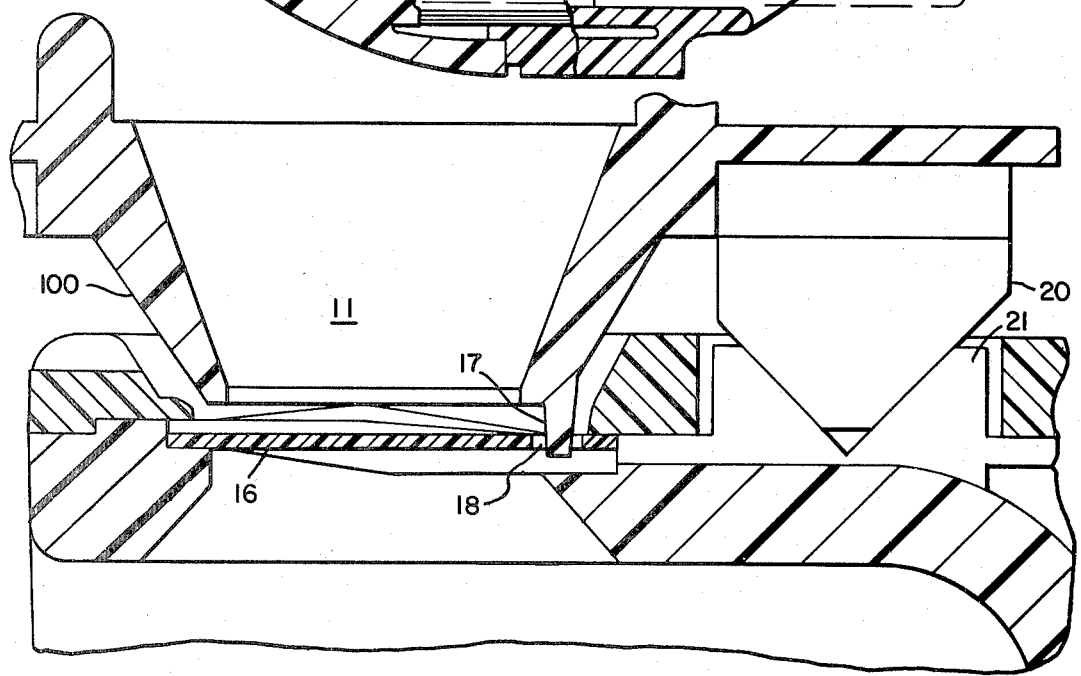

HAND HELD TRANSPARENCY PROJECTOR WITH SIMPLE ADVANCE MECHANISM

This application is a continuation, of application Ser. No. 115,581, filed Jan. 25, 1980 now abandoned.

BACKGROUND OF THE INVENTION

The present invention relates generally to still projection devices and more particularly to a hand-held projection device which is adapted for projection of pictures from a film strip housed within a cartridge.

In most devices of the hand-held projector type, numerous inter-related small parts (wheels, pawls, springs, levers, cams, etc.) form the film-advance mechanism. The relatively large number of parts in conventional systems contributes to cumulative dimensional tolerances which tend to add to manufacturing cost and result in unreliable and marginal product performance.

The object of this invention is to overcome the above deficiencies without sacrificing quality or dependability. It is intended to provide a rugged, simple mechanism of few parts, high reliability and low manufacturing cost.

A more specific oobject of the present invention is to provide a hand-held projector which has a drive mechanism capable of intermittently advancing the film at a speed determined by the operator of the projector.

A further specific object of the invention is to provide a hand-held projector which includes a film driving claw for engaging and advancing the film in a cartridge in discrete linear steps.

A still further object of the present invention is to provide a projector of the type in which the film is driven by a manual hand operation which is easy to use, minimizes eye discomfort, is relatively noiseless, and is relatively inexpensive to manufacture.

Other objects, features and advantages of the present invention will become more apparent from the detailed description of the invention in connection with the drawings to be described more fully hereinafter.

SUMMARY OF THE INVENTION

The foregoing objects are generally accomplished by providing a hand-held projector which includes a housing, a recess formed in one side of the housing for receiving a film cartridge, a projection aperture in the housing through which images on the film within the cartridge can be projected when the cartridge is positioned within the recess. A film driving means is carried within the housing for engaging and advancing the film past the projecting aperture. The housing comprises means for supporting at least one battery within the housing, actuating means for selectively connecting the battery for selective energization of a projection light source. A claw within the housing is positioned to engage perforations in the film of the cartridge when the cartridge is placed in the recess of the housing.

BRIEF DESCRIPTION OF THE DRAWINGS

The embodiments of the invention will be described in connection with the following drawings annexed hereto, in which:

FIG. 5 is a exploded perspective view of the cartridge;

FIG. 9 is a sectional view taken along lines 9—9 of FIG. 1;

FIG. 10 is a sectional veiw taken along lines 10—10 in FIG. 2;

FIG. 11 is a sectional veiw taken along lines 11—11 of FIG. 10;

FIG. 13 is an exploded perspective view of the projector shown in FIG. 1 illustrating each of the various elements thereof;

FIG. 14 is a sectional view taken along lines 14—14 in FIG. 2;

FIG. 18 is a sectional view taken along lines 18—18 of FIG. 17; and

DESCRIPTION OF THE INVENTION

Figure 1:
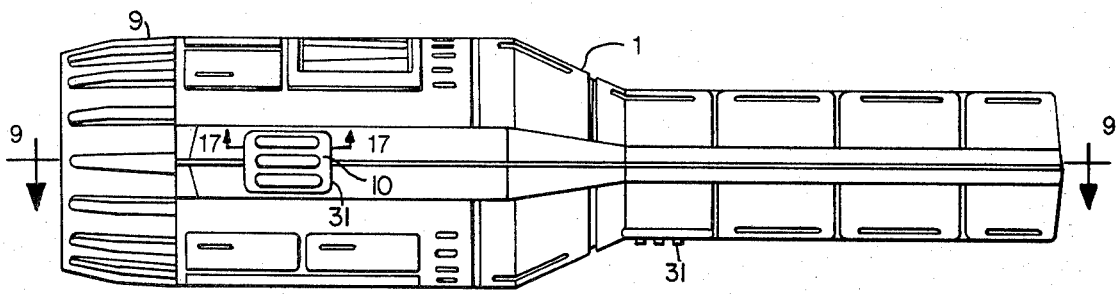
FIG. 1 is a top plan view of the projector.
Figure 2:
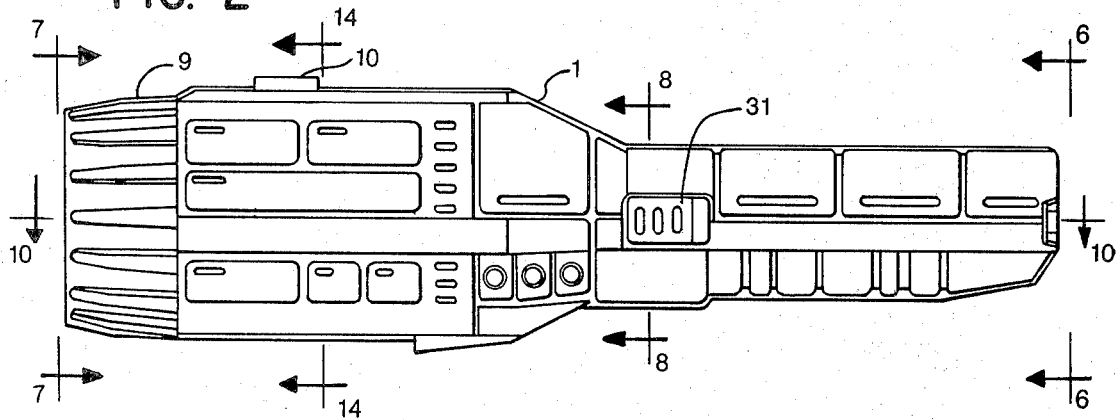
FIG. 2 is a left side elevational view of the projector shown in FIG. 1.
Figure 3:
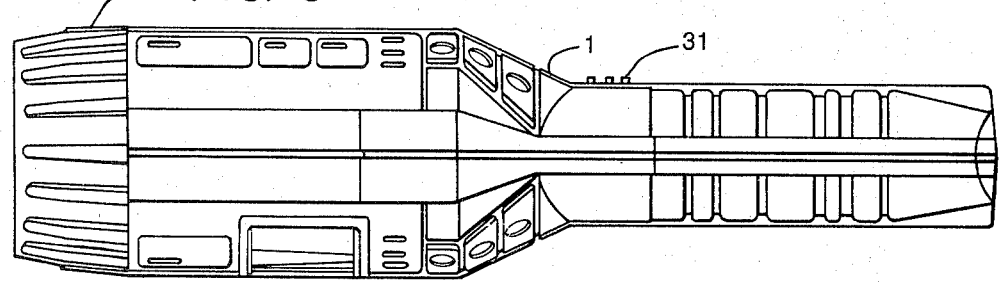
FIG. 3 is a bottom plan view of the projector shown in FIG. 1.
Figure 4:
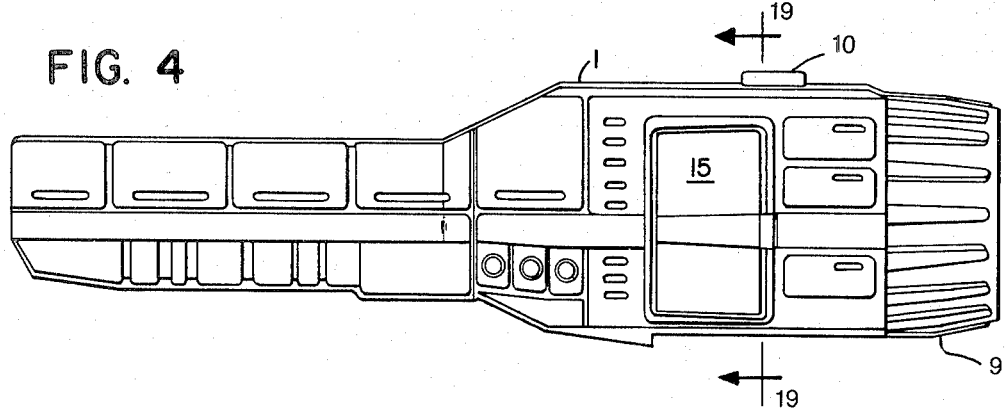
FIG. 4 is a right side elevational view of the projector and cartridge shown in FIG. 1.
Figure 7:
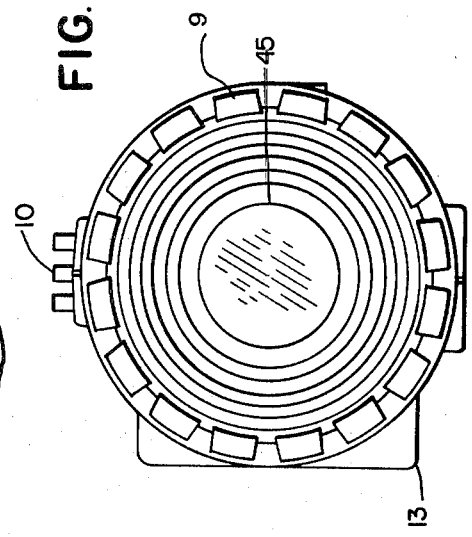
FIG. 7 is a front view of the projector shown in FIG. 1.
Figure 12:
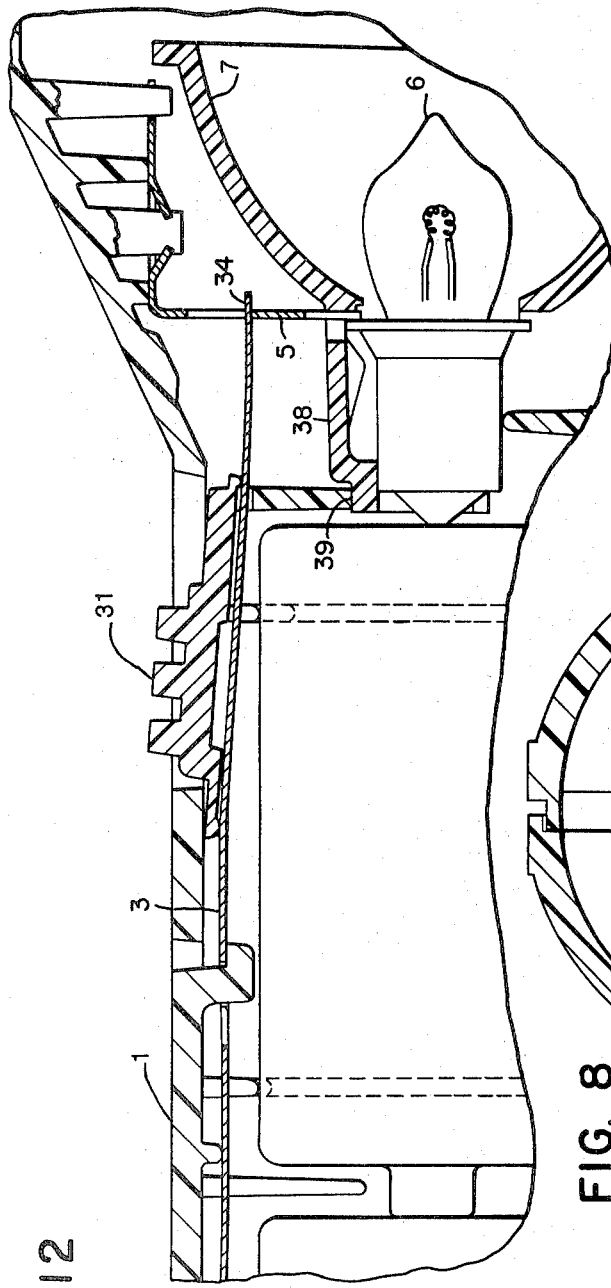
FIG. 12 is a enlarged sectional view taken along lines 12—12 of FIG. 9.
Figure 8:
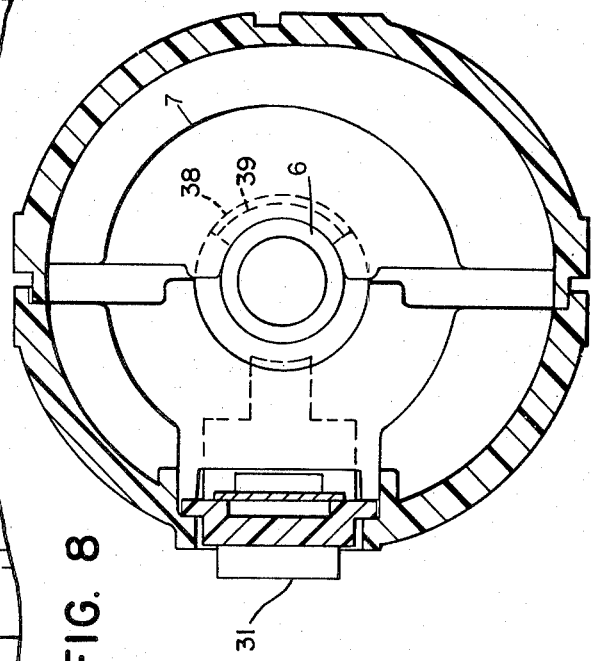
FIG. 8 is a sectional view taken along lines 8—8 of FIG. 2.
Figure 6:
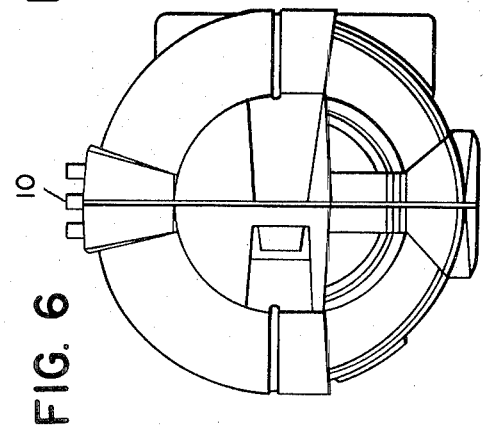
FIG. 6 is a rear view of the projector of FIG. 1.
Figure 19:
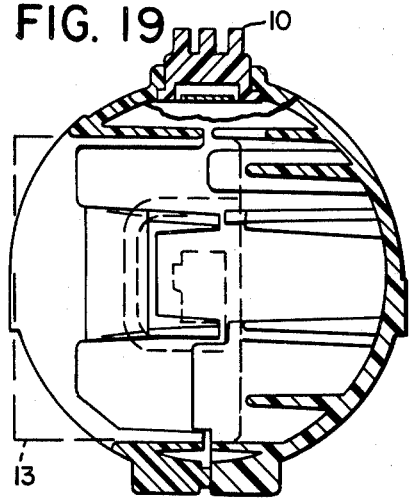
FIG. 19 is a sectional view taken along lines 19—19 of FIG. 4.

Referring now in more detail to the accompanying drawings, FIG. 13 shows housing 1 which contains battery compartment 2 with battery contact strip 3 secured to the battery compartment 2. Battery strip 3 has a spring end 4 for holding the base of a battery. On the other end of battery strip 3 is contact tip 34 which makes resilient contact with bulb contact 5. Button 31 is in slideable contact with housing 1 and strip 3 having a first position where there is no electrical contact between strip 3 and bulb 6 and a second position which activates battery strip 3 so that tip 34 makes contact with bulb contact 5 to send electric current from the battery in battery compartment 2 to bulb 6. Bulb 6 is housed in reflector 7 by means of bulb 6 being pressed into cutout 38 and into interference fit with collar 39 for secure placement. Transparent shield 103 is placed between reflector 7 and cartridge 13 such that parts from breakage of bulb 6 cannot fall out. In FIGS. 9, 10 and 13, reflector 7 reflects light to lens system 8 which includes lens 42 and lens 45 and is housed in focus housing 9. Located between reflector surface 7 and housing 9 containing lens system 8 is film drive 10. Film drive 10 contains aperture 11 allowing transmission of light from bulb 6 through lens system 8 onto any surface along the axis formed by the line through bulb 6 and lens system 8. Also housed in housing 1 is cartridge spring 12 which secures cartridge 13 in place when cartridge 13 is inserted in opening 15 of housing 1. When cartridge 13 is inserted in housing 1 through opening 15 film 16 is located perpendicular to the axis formed by a line drawn through the center of bulb 6 and lens system 8 as well as being adjacent to aperture 11 when actuator 10 is in its normal postion (projection mode).

As cartridge 13 is inserted into housing 1 through opening 15 cartridge cover is cammed by protrusions 20 away from advance claw 17. In this manner advance claw 17 is protected from breakage as cartridge 13 is being installed. When protrusions 20 engage guide notches 21 (FIG. 15) in cartridge 13 the cartridge moves toward actuator 10 by the force imposed by cartridge spring 12, thereby locating cartridge.

Figure 17:
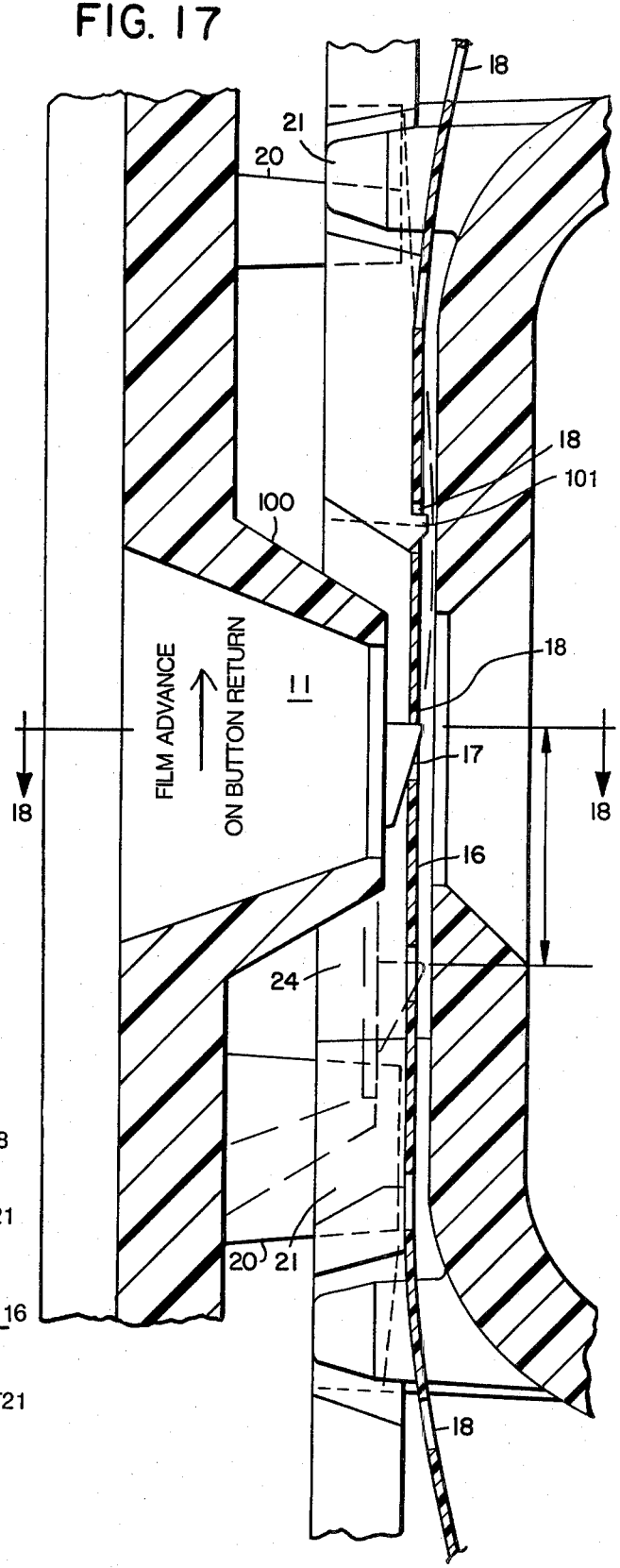
FIG. 17 is a sectional view taken along lines 17—17 of FIG. 1.

Turning now to FIGS. 14 and 18 we see that aperture 11 is housed in a raised tapered rectangular Boss 100. On Boss 100 is advance claw 17 which is tapered such that it comes out of contact with perforations 18 when actuator 10 is depressed and makes contact with perforations 18 of film 16 when actuator or push means 10 is released. The depressing movement of the actuator may be referred to as the positioning stroke and the releasing movement as the film advancing return stroke of the actuator. In this manner film claw 17 advances film 16 through perforations 18 one frame at a time each time actuator 10 is released after depressing. Also mounted on actuator 10 is spring 19 which holds actuator 10 against housing 1 and is resilient such that actuator 10 may be depressed in relation to housing 1 in order to have film advance claw 17 move film 16 one frame. To hold film 16 in place during downward movement of actuator 10 a claw 101 shown in FIG. 17 engages film perforation 18. Claw 101 is integral with cartridge 13 cover shown in FIG. 5. Spring 19 then places tension on actuator 10 to return actuator 10 to its initial or release position after actuator 10 is released.

Figure 16:
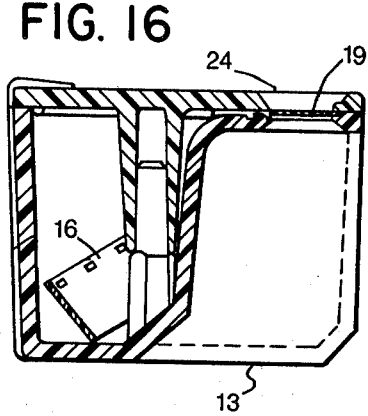
FIG. 16 is a sectional view taken along lines 16—16 of FIG. 15 with cover in place.
Figure 15:
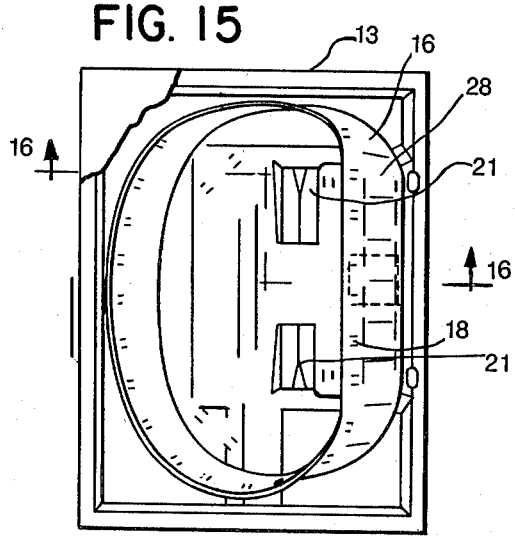
FIG. 15 is a front side view of the film cartridge with cover cut-away.

Located on actuator 10 as shown in FIG. 13 are guide protrusions 20 which mate with guide notches 21 of cartridge 13 as shown in FIG. 15. The protrusions 20 and notches 21 retain actuator aperture 11 in slidable alignment with the frames of film 16 so that each frame is in alignment with the axis formed by a line drawn through the center of lens system 8 and bulb 6. Alignment of actuator 10 in relation to housing 1 is provided by spring arms 22 being integral with actuator 10 for slideable contact along the inner surface 23 of housing 1, as shown in FIG. 14, the resilient nature of said arms 22 maintaining actuator 10 in slideable contact with cartridge 13 when cartridge 13 is inserted into housing 1. Film advance claw 17 has access to film 16 and perforations 18 through cartridge aperture 24 as shown in FIG. 16. As can be seen, cartridge aperture 24 when placed in housing 1 has the same axis as aperture 11 when spring 19 maintains actuator 10 in its normal position. The aperture 24 is sized such that the perforations of the film strip are exposed to the advance claw 17, thereby to enable such claw to make contact with and engage such perforations to advance the film frame by frame on each advancing stroke of the push means 16.

Located on lenss housing 9 is pin 27 which mates in slideable contact with slot 26 on the inner wall of housing 1. Since slot 26 is on an angle it allows lens housing 9 to move forward and backward within housing 1 to adjust the focus of the projected image as it is being passed from the lens system 8 to its point of viewing.

Turning now to FIG. 15 and FIG. 16 film 16 is placed in cartridge 13 such that there is no surface contact between the pictures located in frames 28 on film 16 and the cartridge housing 13 to prevent scratching of the images on film 16. This is accomplished by having the position of continuous loop film 16 that is to be presently viewed parallel to the surface of cartridge 13 that contains cartridge aperture 24 while having the rest of the loop 16 being angled as it is located in cartridge 13 between the side containing aperture 24 and the opposite side of the cartridge 13, as shown in FIG. 15.

While the present invention has been described and illustrated with respect to a certain preferred embodiment which produces satisfactory results, it will be appreciated by those skilled in the art after understanding the purposes of the invention, that various changes, and modifications may be made without departing from the spirit and scope of the invention, and it is therefore intended to cover all such changes and modifications in the appended claims.

What is claimed is:

1. A hand-held projector for projecting images from a film having perforations along an edge thereof comprising:

a housing;

a projection aperture in one end of the housing through which such images are projected and defining an optical axis therein;

a light source carried within the housing and disposed along the optical axis;

a film cartridge containing an endless loop of the film therein and having a front wall with a cartridge aperture defined therein;

the film cartridge having a guide means for guiding a viewing portion of the film in an aligned, parallel relation to the cartridge aperture;

push means disposed between the light source and projection aperture movable for advancing the film in steps one frame at a time;

the push means including means defining a push means aperture in line with the optical axis; and an advancing claw carried by the push means which upon a film advancing stroke of the push means engages the perforations of the film to advance such film and upon a positioning stroke of the push means avoids engagement with such perforations;

the housing including means defining a cartridge recess adapted to receive the film cartridge and means for removably securing the film cartridge within the cartridge recess such that the light source, cartridge aperture, viewing portion of the film and push means aperture are all in alignment with and perpendicular to the optical axis to enable the image exposed by such viewing portion to be projected through the projection aperture;

the advancing claw of the push means extending into the film cartridge through the cartridge aperture to engage the perforations of the film when the cartridge is secured within the cartridge recess.

2. The projector of claim 1 wherein the guide means of the film cartridge guides a portion of the film generally opposite the viewing portion along a path within the cartridge such that an inner surface of such opposite portion forms an angle no greater than 90° with the front cover of the cartridge, thereby to avoid interference of such portion with the optical axis, while permitting easy advancing of the film.

3. The projector of claim 1 wherein the film cartridge includes means for engaging the perforations of the film so as to hold the film in place during the positioning stroke of the push means while allowing the film to advance during the film advancing stroke of such push means.

4. The projector of claim 1 wherein the push means is slidably supported by the housing and includes aligning means for maintaining the push means in proper alignment between the film cartridge and a supporting portion of the housing when the cartridge is secured within the cartridge recess, whereby the advancing claw of the push means is aligned to engage the perforations of the film during the advancing stroke of the push means.

5. The projector of claim 4 wherein the aligning means comprises resilient arms in slidable contact with the housing having protrusions in slidable contact with the film cartridge when such cartridge is secured within the cartridge recess.

6. The projector of claim 1 wherein the guide means guides a portion of the film loop opposite the viewing portion along a path within the cartridge such that an inner surface of such opposite portion forms an angle no greater than 90° with the front cover of the cartridge, thereby to avoid interference of such portion with the optical axis, while permitting easy advancing of the film;

the film cartridge including means for engaging the perforations of the film so as to hold the film in place during the positioning stroke of the push means while allowing the film to advance during the advancing stroke of such push means;

the push means being slidably supported by the housing and including aligning means for maintaining the push means in proper alignment between the film cartridge and a supporting portion of the housing when the cartridge is secured within the cartridge opening, whereby the advancing claw of the push means is aligned to engage the perforations of the film during the advancing stroke of the push means.

7. In combination with a hand-held projector for projecting images from a film having perforations along an edge thereof, the projector including a housing, means defining a cartridge recess in the housing, a projection aperture in one end of the housing which defines an optical axis therein and a light source carried within the housing disposed along the optical axis, a film cartridge adapted for selective insertion into the cartridge recess comprising:

a front wall;

means defining a cartridge aperture in the front wall;

an endless loop of film contained within the cartridge; and guide means for guiding a viewing portion of the film in an aligned, parallel relation to the cartridge aperture and for guiding a portion of the film generally opposite the viewing portion along a path within the cartridge such that an inner surface of such opposite portion forms an angle no greater than 90° with the front cover, thereby to avoid interference of such portion with the optical axis, while permitting easy advancing of the film.

* * * * *

UNITED STATES PATENT AND TRADEMARK OFFICE
CERTIFICATE OF CORRECTION

PATENT NO. : 4,396,262

DATED : August 2, 1983

INVENTOR(S) : Vitolds Laizans and John J. Richardson

It is certified that error appears in the above-identified patent and that said Letters Patent is hereby corrected as shown below:

In the Title:

"HAND HELD" should be --HAND-HELD--.

In the Abstract:

Last sentence was omitted. Please add --In addition there is an actuating lever for selective electrical connection of a projector light source within a battery source.--

Column 1, line 25, "oobject" should be --object--.

Column 2, line 12, "veiw" should be --view--.

Column 2, line 14, "veiw" should be --view--.

Column 3, line 54, "lenss" should be --lens--.

Signed and Sealed this

Twenty-ninth Day of May 1984

[SEAL]

Attest:

GERALD J. MOSSINGHOFF

Attesting Officer

Commissioner of Patents and Trademarks